United States Patent
Ohara et al.

(10) Patent No.: US 9,835,202 B2
(45) Date of Patent: Dec. 5, 2017

(54) MAGNETIC FLUID SEALED BEARING

(71) Applicant: Globeride, Inc., Tokyo (JP)

(72) Inventors: Takeshige Ohara, Tokyo (JP); Takashi Higashimoto, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 0 days.

(21) Appl. No.: 15/248,568

(22) Filed: Aug. 26, 2016

(65) Prior Publication Data

US 2017/0058955 A1 Mar. 2, 2017

(30) Foreign Application Priority Data

Aug. 28, 2015 (JP) ................................. 2015-169563

(51) Int. Cl.
*F16C 33/76* (2006.01)
*F16C 19/06* (2006.01)
*F16C 33/58* (2006.01)

(52) U.S. Cl.
CPC ............ *F16C 33/765* (2013.01); *F16C 19/06* (2013.01); *F16C 33/583* (2013.01)

(58) Field of Classification Search
CPC ............................... F16C 19/06; F16C 33/765
See application file for complete search history.

(56) References Cited

U.S. PATENT DOCUMENTS 5,161,902 A * 11/1992 Fujii ..................... F16C 33/102
277/410
2015/0063733 A1 3/2015 Ohara
2016/0061263 A1 3/2016 Ohara

FOREIGN PATENT DOCUMENTS

| JP | 57-033222 | | 2/1982 | |
| JP | 01087921 A | * | 4/1989 | ............ F16C 33/765 |
| JP | 2013-228044 | | 11/2013 | |
| JP | 2013228044 A | * | 11/2013 | .............. F16C 19/06 |

* cited by examiner

*Primary Examiner* — Phillip A Johnson
(74) *Attorney, Agent, or Firm* — Pillsbury Winthrop Shaw Pittman, LLP

(57) ABSTRACT

The present invention provides a magnetic fluid sealed bearing having a stable sealing performance and allowing easy build-in of a magnetic sealing mechanism into the bearing. A magnetic fluid sealed bearing according to the present invention includes: an inner ring and an outer ring; a plurality of rolling members disposed between the inner ring and the outer ring; a ring-shaped polar plate mounted on an inner circumferential surface of the outer ring such that a gap is produced between the ring-shaped polar plate and an outer circumferential surface of the inner ring; a ring-shaped magnet attached to an axially inner side surface of the ring-shaped polar plate, the ring-shaped magnet forming magnetic circuits on both the outer ring side and the inner ring side; and an inner ring magnetic fluid retained in the magnetic circuit on the inner ring side for sealing the gap.

14 Claims, 9 Drawing Sheets

MAGNETIC FLUID SEALED BEARING

CROSS-REFERENCE TO RELATED APPLICATIONS

This application is based on and claims the benefit of priority from Japanese Patent Application Serial No. 2015-169563 (filed on Aug. 28, 2015), the contents of which are hereby incorporated by reference in their entirety.

TECHNICAL FIELD

The present disclosure relates to a magnetic fluid sealed bearing that is disposed on various power transmission mechanisms in such a manner as to support a rotation shaft rotatably and prevent foreign substances such as dusts and water from entering inside.

BACKGROUND

Conventional rotation shafts provided in various drive force transmission mechanisms are rotatably supported via bearings. For such rotation shafts, so-called ball bearings are used in order to improve rotation performance of the rotation shafts. Such ball bearings include multiple rolling members (rolling elements) circumferentially disposed between inner and outer rings.

Such bearings are used as support members for rotation shafts of drive force transmission mechanisms in various drive units, and some drive units are desired to prevent foreign substances such as dusts and water from penetrating through the bearings into the units. Moreover, when foreign substances enter into the bearings themselves, rotation performance of such shafts could be deteriorated and noise could be caused. For this reason, Japanese Patent Application Publication No. S57-033222 (the "'222 Publication") and Japanese Patent Application Publication No. 2013-228044 (the "'044 Publication") for example disclose a magnetic fluid sealed bearing having a sealing ability using a magnetic fluid.

In the magnetic fluid sealed bearing disclosed in the '222 Publication, an annular magnet is disposed between inner and outer rings on one side of the opening of the bearing to form a magnetic circuit extending from the outer ring through rolling members to the inner ring, and a magnetic fluid is retained between the magnet and the end surface of the inner ring facing the magnet to prevent foreign substances from entering inside. In the magnetic fluid sealed bearing disclosed in the '044 Publication, a ring-shaped magnet having a ring-shaped polar plate is disposed on opening portions of the inner and outer rings to form a magnetic circuit on both the inner ring side and the outer ring side and retain a magnetic fluid in both a gap on the inner circumferential surface of the outer ring and a gap on the outer circumferential surface of the inner ring, so as to prevent foreign substances from entering from the outer ring side and the inner ring side.

As in the above known techniques, it is necessary to dispose a magnet between inner and outer rings to retain a magnetic fluid in gaps between the inner and outer rings. However, because poor dimension accuracy of the magnet causes irregularity of magnetism in the portion to be magnetically sealed, the resultant sealing performance is instable. Particularly because a ring-shaped magnet is applied onto a step in the inner and outer rings, poor dimension accuracy of the magnet makes it difficult to build in the magnet into the bearing while retaining the concentricity of the magnet and the polar plate, resulting in low work efficiency. In addition, if the magnet is positioned by itself, the sealing performance cannot be stabilized because the magnet may be damaged by an impact during the build-in work or an external impact.

SUMMARY

The present invention addresses the above problems; and one object thereof is to provide a magnetic fluid sealed bearing having a stable sealing performance and allowing easy build-in of a magnetic sealing mechanism into the bearing.

To achieve the above object, a magnetic fluid sealed bearing according to the present invention comprises: an inner ring and an outer ring formed of a magnetic material; a plurality of rolling members disposed between the inner ring and the outer ring; a ring-shaped polar plate formed of a magnetic material and mounted on an inner circumferential surface of the outer ring such that a gap is produced between the ring-shaped polar plate and an outer circumferential surface of the inner ring; a ring-shaped magnet attached to an axially inner side surface of the ring-shaped polar plate, the ring-shaped magnet being magnetized such that magnetic poles thereof point to axial directions and forming magnetic circuits on both the outer ring side and the inner ring side, the ring-shaped magnet having a smaller radial length than the ring-shaped polar plate; and an inner ring magnetic fluid retained in the magnetic circuit on the inner ring side for sealing the gap, wherein the ring-shaped polar plate includes a constraining portion configured to constrain the ring-shaped magnet from moving in an axial direction and a radial direction for positioning and fixing the ring-shaped magnet.

In the above arrangement, the ring-shaped magnet is constrained by the constraining portion provided in the ring-shaped polar plate from moving in the axial direction and the radial direction and thus is positioned and fixed on the ring-shaped polar plate in this manner. That is, the ring-shaped polar plate having better dimension accuracy than the ring-shaped magnet and having the ring-shaped magnet previously positioned and fixed thereon can be built in between the inner ring and the outer ring. In the build-in work, the ring-shaped magnet is positioned and fixed by the ring-shaped polar plate having better dimension accuracy, thereby ensuring the concentricity between these members and increasing the sealing performance with stable magnetism in the magnetic sealing portion. Further, the ring-shaped polar plate and the ring-shaped magnet can be integrated without use of special jigs, and this integrated member is built in between the inner ring and the outer ring of the bearing with increased build-in work efficiency. Also, the ring-shaped magnet does not contact the outer ring and thus is safe from damage by an impact, resulting in stable sealing performance.

The ring-shaped polar plate having the above ring-shaped magnet attached thereto may be mounted on the outer circumferential surface of the inner ring so as to produce a gap on the outer ring side in which an outer ring magnetic fluid is retained to seal the interior.

To achieve the above object, a magnetic fluid sealed bearing according to the present invention comprises: an inner ring and an outer ring formed of a magnetic material; a plurality of rolling members disposed between the inner ring and the outer ring; a ring-shaped polar plate formed of a magnetic material and mounted on an inner circumferential surface of the outer ring such that a gap is produced between the ring-shaped polar plate and an outer circumferential surface of the inner ring; a ring-shaped magnet attached to an axially inner side surface of the ring-shaped polar plate, the ring-shaped magnet being magnetized such that magnetic poles thereof point to axial directions and forming magnetic circuits on both the outer ring side and the inner ring side, the ring-shaped magnet having a smaller radial length than the ring-shaped polar plate; and an inner ring magnetic fluid retained in the magnetic circuit on the inner ring side for sealing the gap, wherein the ring-shaped magnet is adhered to the ring-shaped polar plate so as to produce an inner ring gap and an outer ring gap between the inner ring and the outer ring.

In the above arrangement, the ring-shaped magnet is adhered to the ring-shaped polar plate so as to produce an inner ring gap and an outer ring gap between the inner ring and the outer ring. That is, the ring-shaped polar plate having better dimension accuracy than the ring-shaped magnet and having the ring-shaped magnet previously positioned and adhered thereon can be built in between the inner ring and the outer ring. In the build-in work, the ring-shaped magnet is positioned and fixed by the ring-shaped polar plate having better dimension accuracy, thereby ensuring the concentricity between these members and increasing the sealing performance with stable magnetism in the magnetic sealing portion. Further, the ring-shaped polar plate and the ring-shaped magnet can be integrated simply through adhesion without use of special jigs, and this integrated member is built in between the inner ring and the outer ring of the bearing with increased build-in work efficiency. Also, the ring-shaped magnet does not contact the inner ring or the outer ring and thus is safe from damage by an impact, resulting in stable sealing performance.

The ring-shaped polar plate having the above ring-shaped magnet attached thereto may be mounted on the outer circumferential surface of the inner ring so as to produce a gap on the outer ring side in which an outer ring magnetic fluid is retained to seal the interior.

The present invention provides a magnetic fluid sealed bearing having a stable sealing performance and allowing easy build-in of a magnetic sealing mechanism into the bearing.

DESCRIPTION OF EXAMPLE EMBODIMENTS

Figure 1:
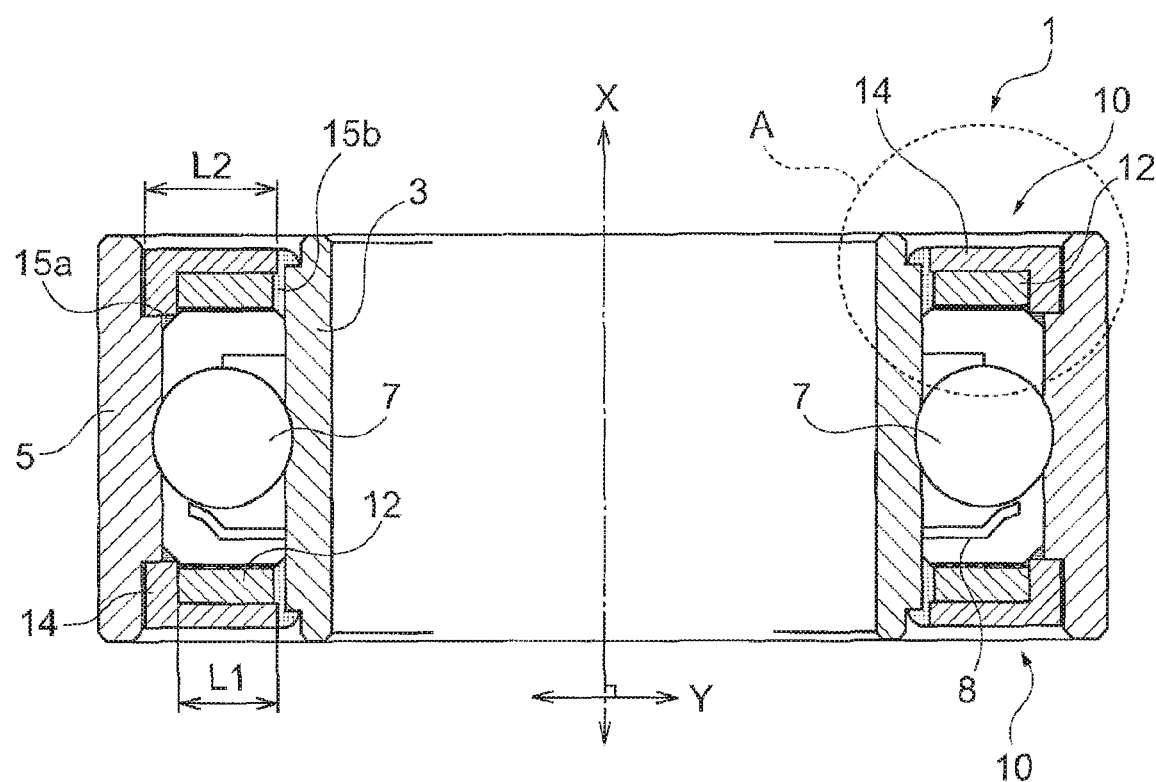
FIG. 1 is a sectional view of a first embodiment of a magnetic fluid sealed bearing according to the present invention viewed along the axial direction thereof.
Figure 2:
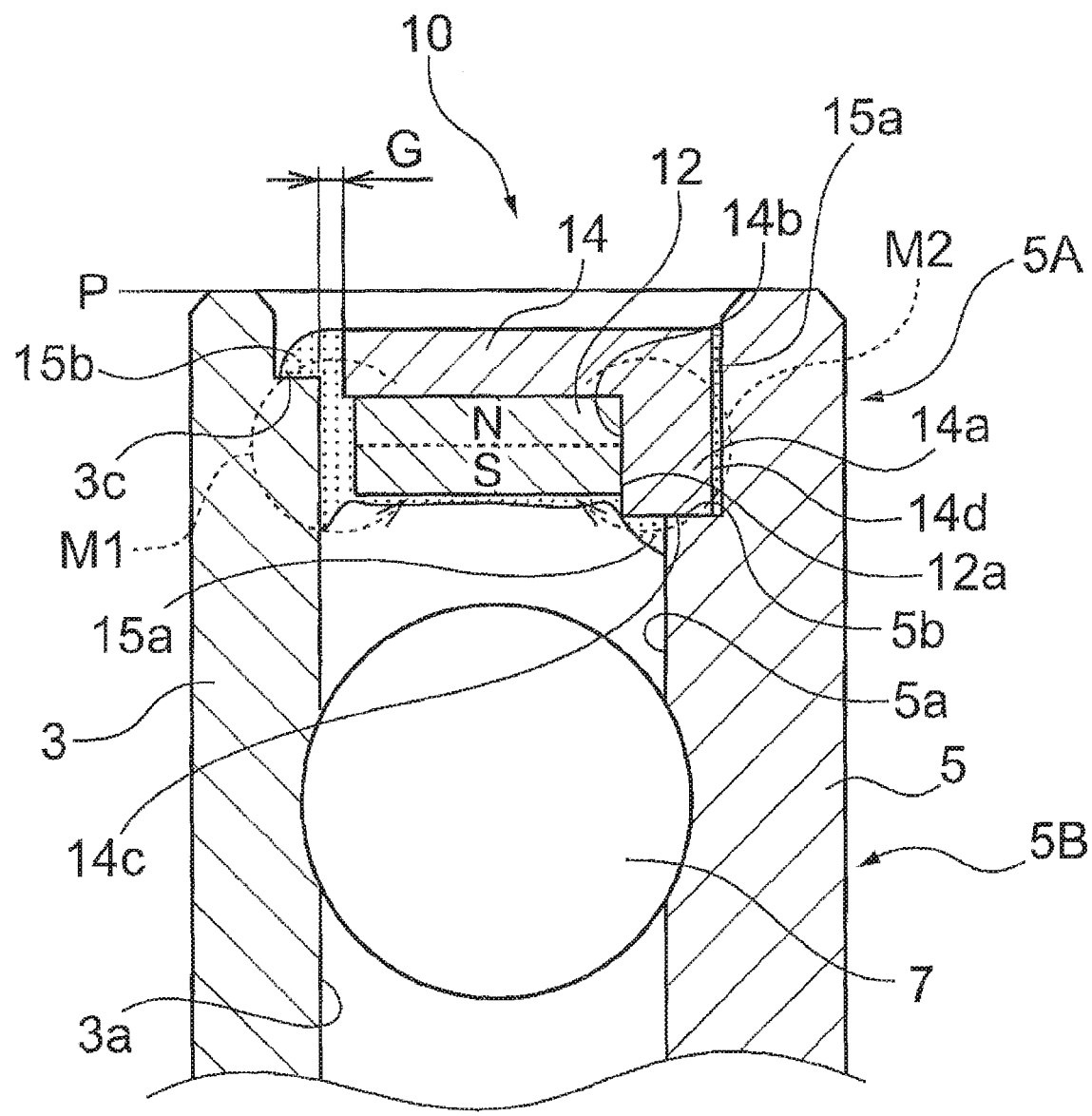
FIG. 2 is an enlarged view of a main part in FIG. 1 (indicated by A).

Embodiments of a magnetic fluid sealed bearing according to the disclosure will be hereinafter described with reference to the drawings. FIGS. 1 and 2 illustrate a first embodiment of a magnetic fluid sealed bearing according to the disclosure; FIG. 1 is a sectional view along the axial direction and FIG. 2 is an enlarged view of the part indicated by A in FIG. 1.

A magnetic fluid sealed bearing 1 (hereunder also referred to as "the bearing") according to the present invention may include a cylindrical inner ring 3, an outer ring 5 encircling the inner ring 3, and a plurality of rolling members 7 placed between the inner ring 3 and the outer ring 5. The rolling members 7 may be retained by a retainer 8 extending in the circumferential direction and allow the inner ring 3 and the outer ring 5 to rotate relative to each other.

The inner ring 3, the outer ring 5, and the rolling members 7 may be formed of a magnetic material such as chrome-based stainless steel (SUS440C); and the retainer 8 may be formed of a highly corrosion-resistant, and heat-resistant material such as a stainless steel material (SUS304). The rolling members 7 may not necessarily be magnetic bodies. The inner ring 3 and the outer ring 5 of this embodiment may have the same (or generally the same) length in the axial direction X (the direction of the core of the bearing); alternatively, the outer ring 5 may be longer in the axial direction than the inner ring 3, or the inner ring 3 may be longer in the axial direction than the outer ring 5.

In the opening between the inner ring 3 and the outer ring 5 may be provided a magnetic sealing mechanism (a magnetic fluid seal) 10. In this embodiment, the same magnetic sealing mechanisms 10 may be provided in the openings on both sides of the inner and outer rings 3, 5. For convenience, the upper side in FIG. 1 (the portion encircled by the dotted line A) will be hereunder described.

The magnetic sealing mechanism 10 may include a ring-shaped magnet (hereinafter also referred to as "the magnet") 12, a ring-shaped polar plate (hereinafter referred to as "the polar plate") 14 having the magnet 12 attached to the axially inner side surface thereof, and magnetic fluids (an outer ring magnet fluid 15a and an inner ring magnetic fluid 15b) retained in magnetic circuits formed by the magnet 12. These members may constitute a sealing ability for shutting out dust, moisture, etc. from the rolling members 7.

The magnet 12 may be a permanent magnet having a high flux density and a high magnetism, such as a neodymium magnet prepared by sintering. The magnet 12 may be previously magnetized such that the magnetic poles (the S-pole, the N-pole) point to the axial direction X (the direction of the axial core of the bearing). On the axially outer side surface of the magnet 12 may be disposed the polar plate 14. The polar plate 14 may have substantially the same shape as the magnet 12 and may be formed of a magnetic material such as chrome-based stainless steel (SUS440C). Accordingly, there may be formed magnetic circuits M1, M2 on the inner ring side and the outer ring side, respectively.

The polar plate 14 of this embodiment may be mounted on the inner circumferential surface 5a of the outer ring 5 so as to form a gap G between the polar plate 14 and the outer circumferential surface 3a of the inner ring 3. The magnet 12 may have a radial length (in the direction Y orthogonal to the axial direction X) smaller than that of the polar plate 14 (L1<L2). The magnet 12 may be attached to the polar plate 14 so as to form a gap between the magnet 12 and the outer circumferential surface 3a of the inner ring 3, the gap having generally the same width as the gap G (in the drawing, this gap is slightly larger than the gap G). Further, the magnet 12 may be constrained from moving in the axial direction X and the radial direction Y relative to the polar plate 14 and thus may be positioned and fixed in this manner.

In the embodiment, the polar plate 14 may include a constraining portion 14a for positioning and fixing the magnet 12. The constraining portion 14a may be an annular wall formed at a radial end of the flat and ring-shaped polar plate 14 on the outer ring side, the annular wall being bent toward the rolling members (the constraining portion 14a may also be hereunder referred to as "the outer ring-side wall 14a"). The ring-shaped magnet 12 may have the outer circumferential surface 12a thereof contacted with the outer ring-side wall 14a (the inner circumferential surface 14b of the outer ring-side wall 14a), thereby to be positioned in the axial direction and the radial direction relative to the polar plate 14 and fixed by magnetic adhesion therebetween. The outer ring-side wall 14a should preferably be higher than the thickness of the magnet 12 in the axial direction. With such arrangement, the magnet 12 integrated with the polar plate 14 may not project toward the rolling members, thus preventing damage of the magnet during build-in work.

The magnet 12 and the polar plate 14 magnetically adhering to each other as described above may be previously integrated into a unit. This unit (12, 14) may be inserted into the opening between the inner ring 3 and the outer ring 5 and mounted on the inner circumferential surface 5a of the outer ring 5. Since the magnet 12 and the polar plate 14 magnetically adhere to each other and are positioned and fixed by the constraining portion 14a, use of an adhesive for adhesion therebetween is not necessary but may be possible before integration into a unit.

A step 5b may be projected from the inner circumferential surface 5a of the outer ring 5 toward the rolling members. Due to the presence of the step 5b, the outer ring 5 may include thin regions 5A near both openings and a thick region 5B near the rolling members. Thus, the distance between the inner ring and the outer ring is larger in the axially outer regions than in the axially inner region. The step 5b may be used to position and fix the unit (12, 14), which may be inserted into the opening such that the end surface of the outer ring-side wall 14a of the polar plate 14 (the end surface facing the rolling members) may abut the step 5b. Therefore, the step 5b should preferably have a surface orthogonal to the axial direction. The step 5b may also include a staircase or may be sloped instead of having the vertical surface as in the embodiment, as long as the polar plate 14 can be stably retained.

As described above, the polar plate 14 may be inserted between the inner and outer rings and may abut the step for positioning and fixation. The outer ring-side wall 14a of the polar plate 14 may be formed with some degree of play with respect to the inner circumferential surface of the outer ring 5. That is, a slight gap may be produced in the fitting portion between the outer circumferential surface 14d of the outer ring-side wall 14a and the inner circumferential surface 5a of the outer ring 5 for smooth fitting in build-in, thereby facilitating the build-in work.

A magnetic fluid (inner ring magnetic fluid 15b) may be retained in the gap G formed between the polar plate 14 and the inner ring 3. The retained magnetic fluid may be prepared by dispersing magnetic fine particles such as $Fe_3O_4$ into a base oil using a surfactant so as to have viscosity and react with a magnet brought close. That is, such a magnetic fluid may be retained in the gap G to seal the gap G.

As stated above, when the polar plate 14 retaining the magnet 12 magnetized such that the magnetic poles point to the axial directions is mounted on the inner circumferential surface of the outer ring 5, magnetic flux (magnetic circuits M1, M2) may be formed at the inner ring 3 and the outer ring 5 so as to be symmetric with respect to the axial directions. Thus, the gap G between the polar plate 14 and the inner ring 3 and the gap between the magnet 12 and the inner ring 3 may retain the inner ring magnetic fluid 15b. More specifically, when the gap G is filled with the magnetic fluid by using an injection apparatus such as a dropper, the magnetic fluid may be retained in the gap G by the magnetic circuit M1. If a larger amount of magnetic fluid is injected, it can also be retained in the gap between the magnet 12 and the inner ring 3.

Since the magnet 12 is magnetized in the axial direction as described above, the same magnetic circuit M2 may be formed on the outer ring side. When a larger amount of magnetic fluid is filled into the gap G, the magnetic fluid may move from the magnetic circuit M1 side to the magnetic circuit M2 side to enter a region where the magnetic fluid is retained. More specifically, the magnetic fluid may move along the surface of the magnet 12 to the boundary between the step 5b and the end surface 14c of the outer ring-side wall 14a of the polar plate 14, and may be retained by the magnetic circuit M2 formed on the outer ring side to form the outer ring magnetic fluid 15a. If the outer ring-side wall 14a of the polar plate 14 is formed with some degree of play with respect to the inner circumferential surface of the outer ring 5, a slight gap may be produced after build-in between the outer circumferential surface 14d of the outer ring-side wall 14a and the inner circumferential surface 5a of the outer ring 5. Therefore, if such a slight gap is produced on the outer ring side, the magnetic fluid (outer ring magnetic fluid 15a) should preferably be filled in this slight gap, and the magnetic fluid 15a may be retained by the magnetic circuit M2. That is, in the embodiment, the magnetic fluid may be retained not only in the gap G but also on the side where the polar plate 14 is fixed, so as to ensure the internal sealing ability. Additionally, the dimensions of this slight gap can be managed easily because of high fabrication accuracy of the polar plate 14.

A step 3c should preferably be formed in the outer circumferential surface of the inner ring 3 at a portion facing the polar plate 14 so as to project in the direction orthogonal to the outer circumferential surface. Due to the presence of the step 3C, the inner ring magnetic fluid 15b may be retained so as to extend in the radial direction, increasing the sealing ability. The polar plate 14 should preferably be fixed in such a position as to be recessed from the exposed end surface level P of the inner ring 3 and the outer ring 5 toward the rolling members. Since the polar plate 14 is recessed, the magnetic fluid may be less subject to contact with external objects and may be safe from dispersion.

In the bearing 1 described above, the polar plate 14 and the magnet may be integrated together by adhesion and fixation to achieve better build-in work efficiency. In particular, the polar plate 14 may abut the step 5b of the outer ring 5 by magnetism for positioning and fixation to achieve better build-in work efficiency. In sealing, it is necessary only to magnetize the magnet 12 constituting a member such that the magnetic poles point to the axial directions and to dispose the magnet 12 in contact with the polar plate 14. Therefore, a small number of parts are required, and the magnet 12 is not required to have accurate dimensions, which facilitates the build-in work and reduces the cost. Further, the magnet 12, which retains the magnetic fluid on both the inner ring side and the outer ring side, is configured as one member; therefore, magnetic fluid seals can be simultaneously formed on the inner ring side and the outer ring side by oiling from one location, which increases the work efficiency.

The polar plate 14 can be fabricated to have better dimension accuracy than the magnet 12 and may be fitted on the outer ring 5, thereby to maintain highly accurate concentricity and stabilize the sealing performance of the magnetic fluid. Further, since the constraining portion 14a is formed as an annular wall with a height larger than the thickness of the magnet 12 in the axial direction, the magnet 12 may not directly contact with the outer ring 5 and thus may be protected from damage, thereby stabilizing the sealing performance.

In the above embodiment, the constraining portion 14a constraining the magnet 12 from moving in the axial and radial directions for positioning and fixation may be constituted by an annular wall formed on the outer ring side. However, the constraining portion may be configured desirably as long as it can position the ring-shaped magnet 12. Therefore, the polar plate 14 may be susceptible to desired modifications. For example, the polar plate 14 may have a projection formed therein to be abutted by a part of the magnet 12 or may be constituted by walls formed intermittently along the circumferential direction.

Figure 3:
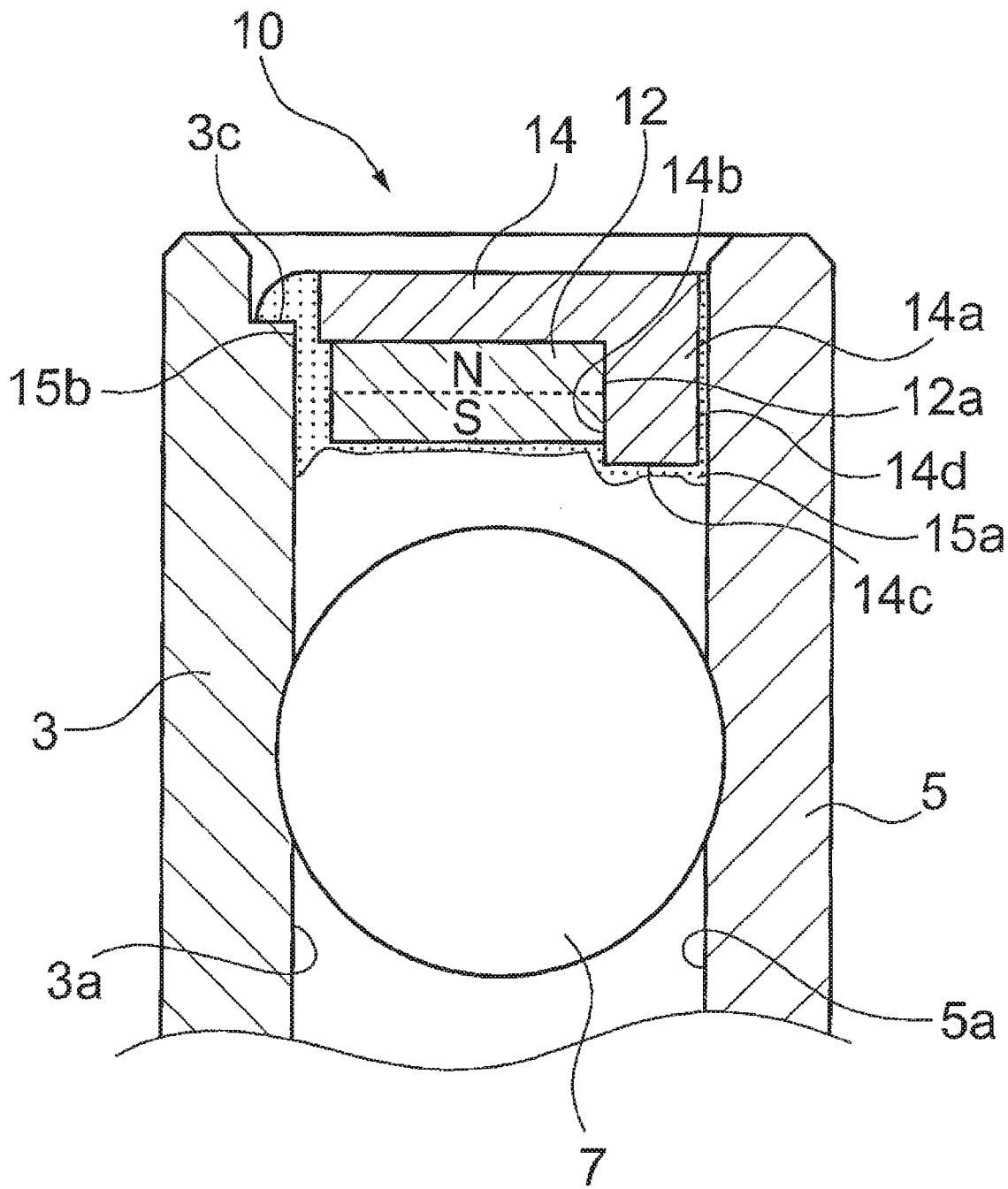
FIG. 3 is an enlarged view of a main part of a second embodiment of the present invention.

FIG. 3 shows the second embodiment of the present invention. In the following description of the embodiment, the same elements as in the first embodiment will be denoted by the same reference numerals and detailed descriptions thereof will be omitted.

In the embodiment, no step may be formed in the inner circumferential surface 5a of the outer ring 5 unlike the first embodiment, and the inner circumferential surface may be straight along the axial direction and press the outer ring-side wall 14a of the polar plate 14 for positioning and fixation. In such arrangement, fabrication of a step in the outer ring 5 is unnecessary and thus costs may be reduced, and moreover, the outer ring has no partial variation in thickness and thus may be safe from reduction in strength without upsizing for maintaining the strength.

In such arrangement, the outer ring magnetic fluid 15a can also be spread and retained in the press-fitting portion between the inner circumferential surface 5a of the outer ring 5 and the outer circumferential surface 14c of the outer ring-side wall 14a. Naturally, the polar plate can be fabricated accurately and may be press-fitted for fixation, and therefore, it may also be possible that the magnetic fluid is not retained. Further, the inner circumferential surface 5a of the outer ring 5 may have a chamfered (tapered) portion instead of a step, for positioning the outer ring.

Figure 4:
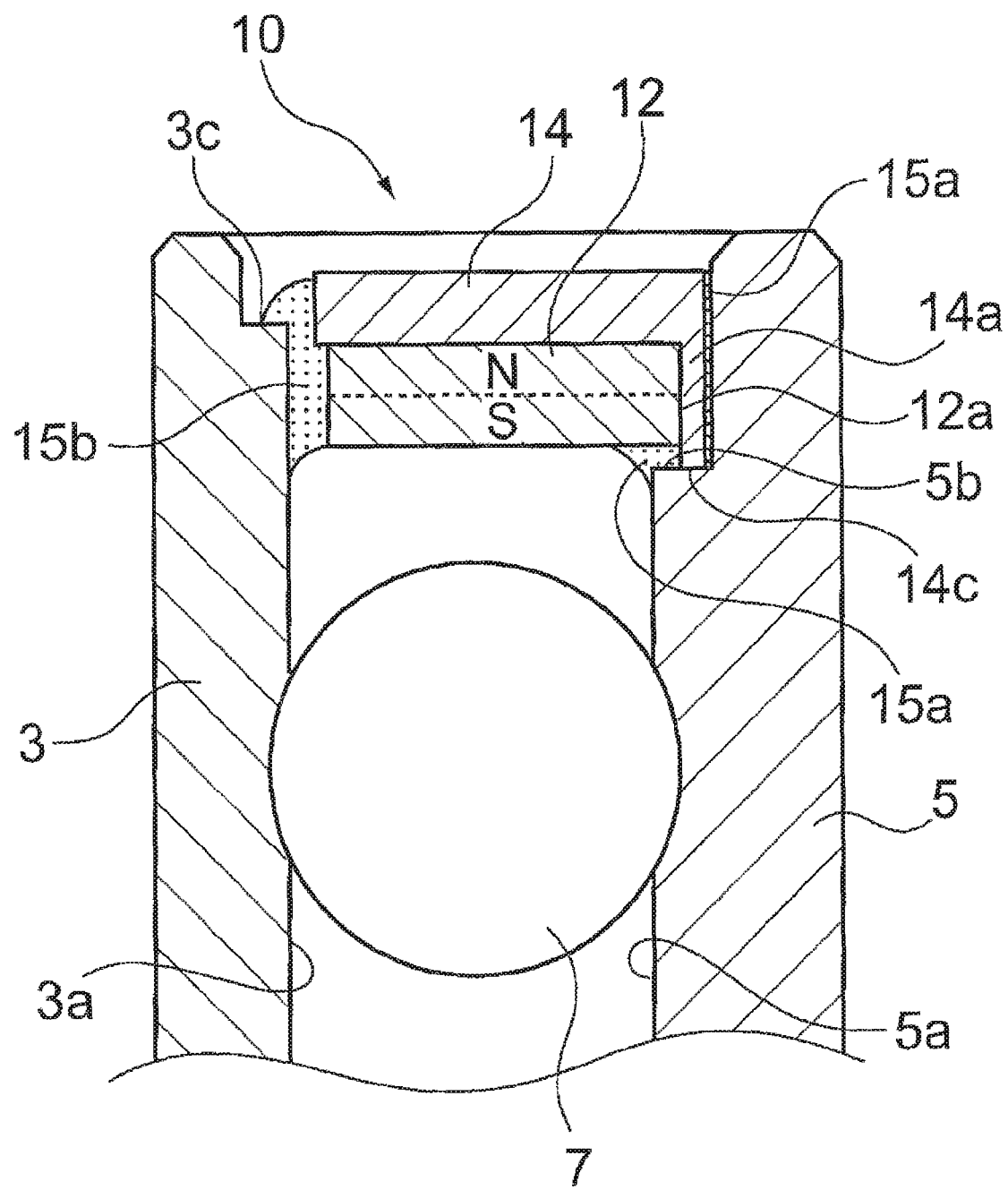
FIG. 4 is an enlarged view of a main part of a third embodiment of the present invention.

FIG. 4 shows the third embodiment of the present invention. In the embodiment, the outer ring-side wall 14a of the polar plate 14 for positioning and fixing the magnet 12 may be thinned (the outer ring-side wall 14a may have a thickness smaller than the radial length of the step 5b).

With such arrangement, the magnet 12 can be disposed closer to the outer ring, and the magnetic field intensity on the outer ring side may be higher than in the embodiment shown in FIG. 2. Thus, a larger amount of outer ring magnetic fluid 15a can be retained to stabilize the sealing performance.

Figure 5:
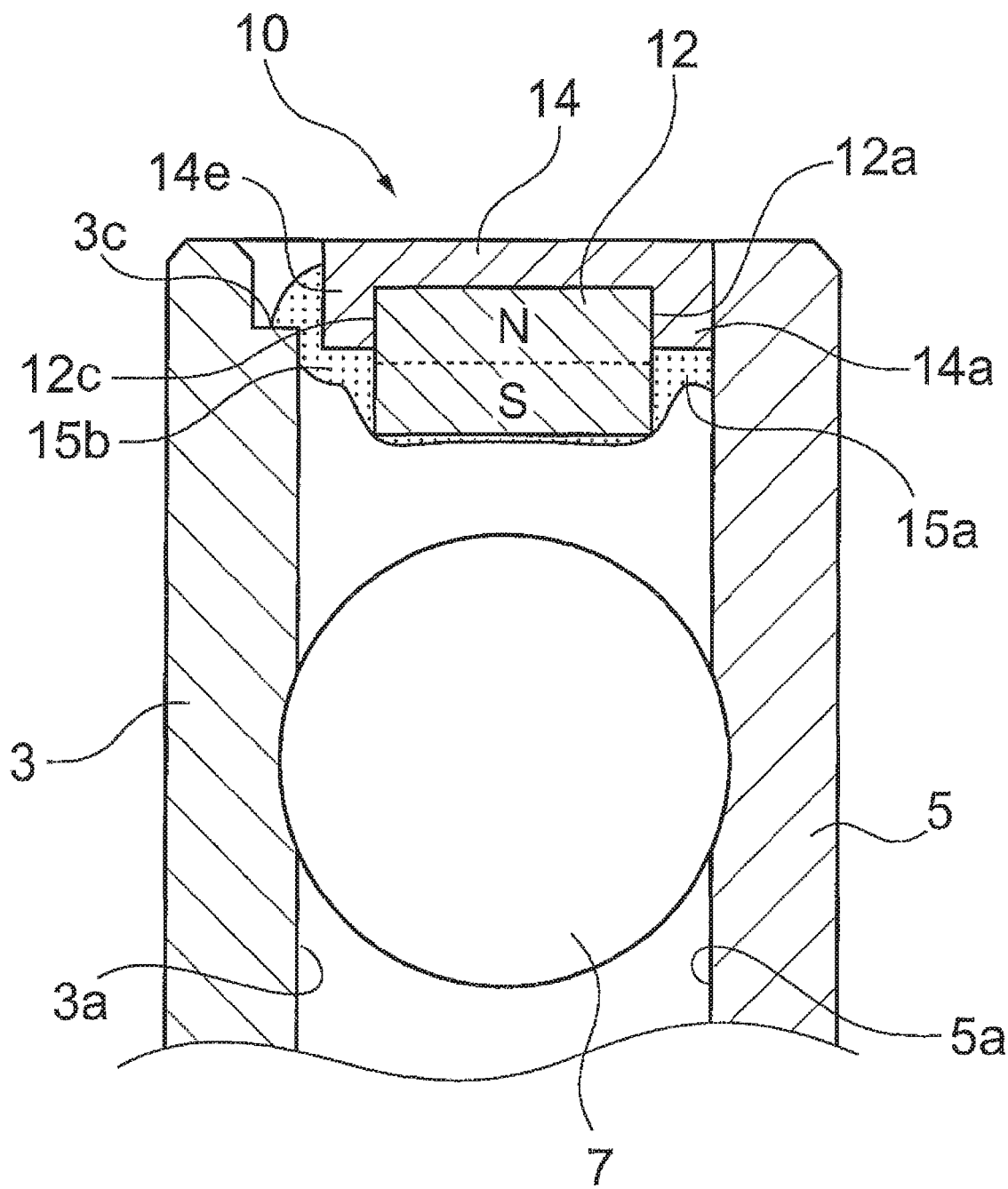
FIG. 5 is an enlarged view of a main part of a fourth embodiment of the present invention.

FIG. 5 shows the fourth embodiment of the present invention. In the embodiment, the polar plate 14 may have another constraining portion on the inner ring side, for positioning and fixing the magnet 12. That is, the polar plate 14 shown in FIG. 2 may be bent at the radial end portion on the inner ring side toward the rolling members to form the annular inner ring-side wall 14e. The inner circumferential surface 12c of the magnet 12 may abut the inner surface of the inner ring-side wall 14e for positioning and fixing.

With such arrangement, an annular recess may be formed under the flat portion of the polar plate 14 having a ring-like shape, and therefore, the magnet 12 can be positioned and fixed on the polar plate 14 more easily and can remain fixed on the polar plate 14 stably.

In the embodiment, the polar plate 14 may be press-fitted onto the inner circumferential surface of the outer ring 5 for positioning and fixation. However, it may also be possible that a step is formed in the inner circumferential surface 5a of the outer ring 5 for positioning and fixing the polar plate 14, as shown in FIG. 2. Further, the constraining portion (annular wall) may be formed only on the inner ring side.

Figure 6:
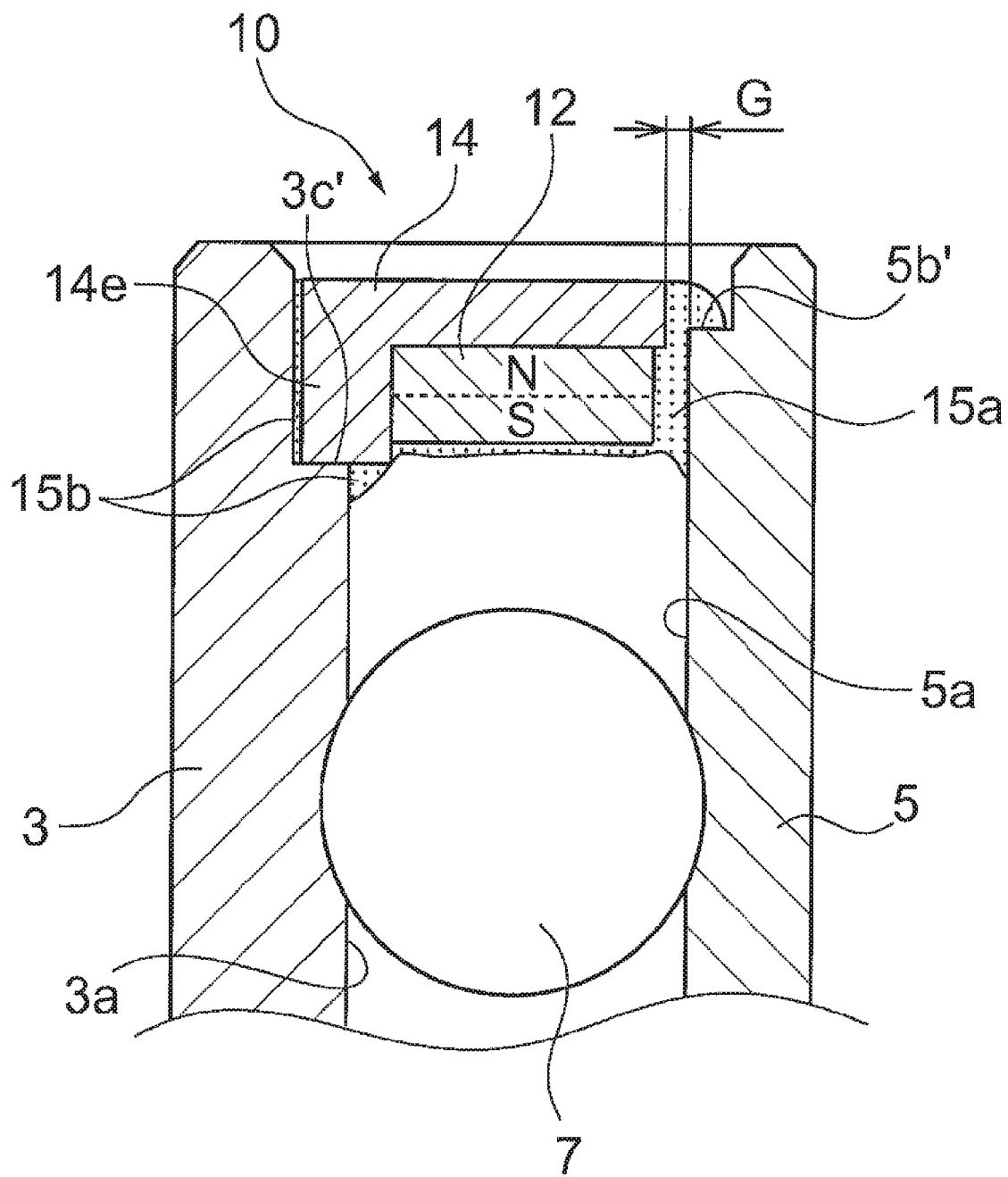
FIG. 6 is an enlarged view of a main part of a fifth embodiment of the present invention.

FIG. 6 shows the fifth embodiment of the present invention. In the above embodiments, the polar plate 14 may be mounted on the outer ring side. However, it may also be possible that the polar plate 14 be mounted on the outer circumferential surface 3a of the inner ring 3, as shown in FIG. 6.

That is, the ring-shaped polar plate 14 may be mounted on the outer circumferential surface 3a of the inner ring 3 so as to produce the gap G between the polar plate 14 and the inner circumferential surface 5a of the outer ring 5, and the radial end portion on the inner ring side may be bent toward the rolling members to form an annular inner ring-side wall (constraining portion) 14e. The polar plate 14 may be magnetized such that the magnetic poles thereof point to axial directions, and the ring-shaped magnet 12 having a radial length smaller than that of the ring-shaped polar plate may be constrained by the inner ring-side wall 14e from moving in the axial and radial directions for positioning and fixation.

In fixing the polar plate 14 on the inner ring 3, a step 3c' may be formed in the outer circumferential surface of the inner ring on the rolling member side, as is the step in the outer ring shown in FIG. 2, and the step 3c' may be abutted by the end surface of the inner ring-side wall 14e for positioning. Further, a step 5b' may be formed in the portion of the outer ring 5 facing the gap G to retain the outer ring magnetic fluid 15a stably.

Thus, when the polar plate 14 is mounted on the inner ring side, the same advantages as in the first embodiment can be produced.

Additionally, the embodiment having the polar plate 14 mounted on the inner ring side may also be configured as in the embodiments shown in FIGS. 3 to 5. For example, the outer ring-side wall (constraining portion) may be formed in the radial end portion in the outer ring side of the polar plate 14 for positioning and fixing the magnet, or the inner ring-side wall 14e may be press-fitted and fixed without forming the step 3c' in the inner ring. Further, as shown, the inner ring magnetic fluid 15b may also be retained on the inner ring side. In such arrangement, the same advantages as in the above embodiments can be produced.

Figure 7:
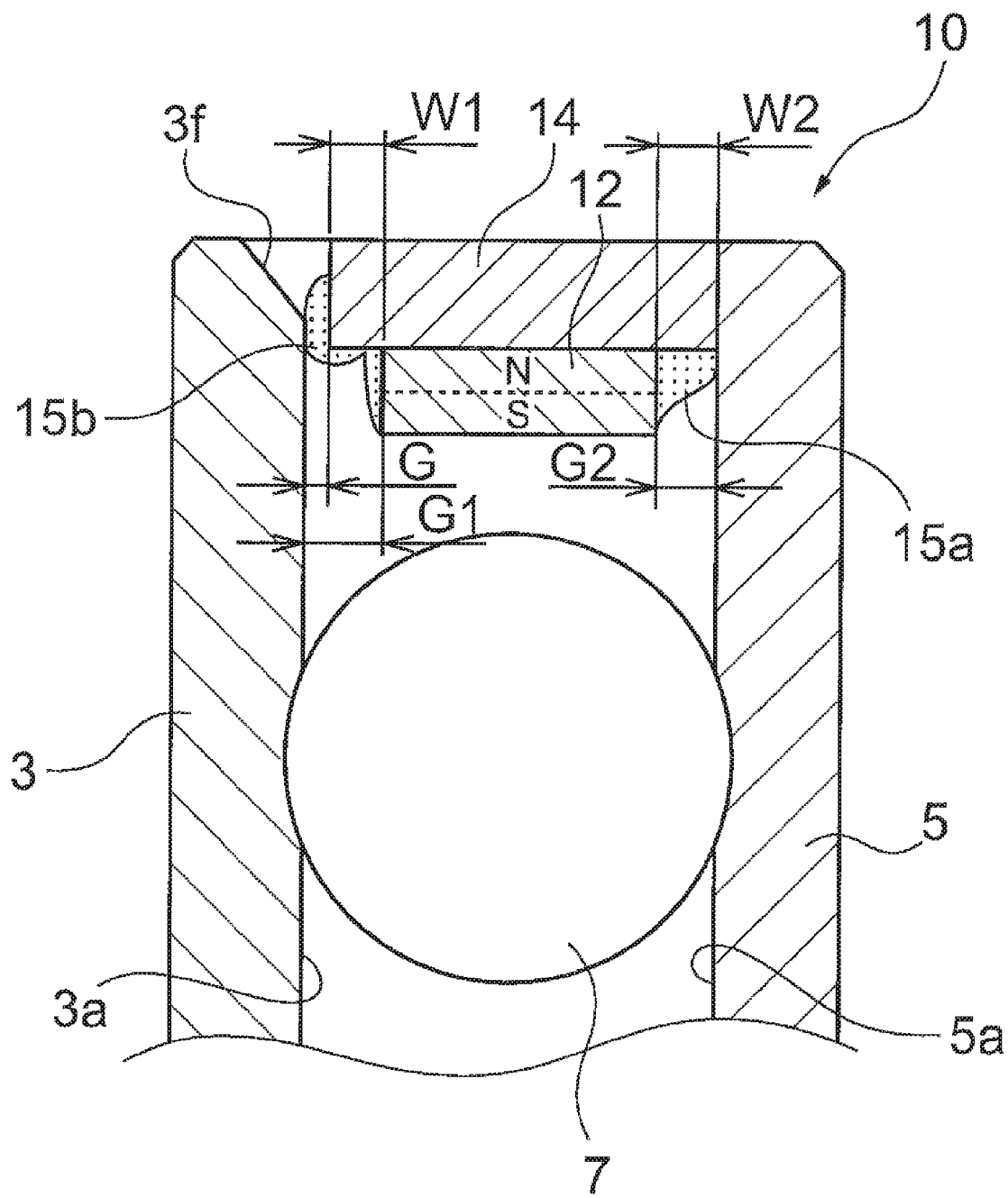
FIG. 7 is an enlarged view of a main part of a sixth embodiment of the present invention.

FIG. 7 shows the sixth embodiment of the present invention. In the embodiment, the ring-shaped polar plate 14 for positioning and fixing the ring-shaped magnet 12 may be formed flat with no constraining portions as described above. The polar plate 14 may be press-fitted onto the inner circumferential surface 5a of the outer ring 5 for positioning and fixation so as to produce the gap G between the polar plate 14 and the outer circumferential surface of the inner ring.

The ring-shaped magnet 12 may be attached to the axially inner side surface of the polar plate 14 and have generally the same shape as the ring-shaped polar plate 14 with a radial length smaller than that of the polar plate 14. As in the embodiments described above, the magnet 12 may be magnetized such that the magnetic poles thereof point to the axial directions and the magnetic circuits may be formed on both the outer ring side and the inner ring side.

The magnet 12 and the polar plate 14 may be previously adhered and fixed together into a unit so as to attain concentricity via jigs, and the unit (12, 14) may be press-fitted onto the inner circumferential surface 5a of the outer ring 5 for mounting. In the unit mounted, the magnet 12 may be adhered to the polar plate 14 so as to produce gaps (the inner ring gap G1 and the outer ring gap G2) between the magnet and the outer circumferential surface 3a of the inner ring 3 and between the magnet and the inner circumferential surface 5a of the outer ring 5.

In such a magnetic sealing mechanism, the magnet 12 may not project beyond the radial ends of the polar plate 14, and the magnet 12 may not be in contact with the inner ring or the outer ring. Therefore, the magnet may be prevented from being damaged during the build-in work. In such arrangement, the magnet 12 should preferably be adhered to the polar plate 14 so as to be biased to the gap G side (the inner ring side in the embodiment). More specifically, the magnet 12 should preferably be adhered to the polar plate 14 such that the distance W1 from the inner circumferential edge of the magnet 12 to the inner circumferential edge of the polar plate 14 is smaller than the distance W2 from the outer circumferential edge of the magnet 12 to the outer circumferential edge of the polar plate 14 (W1<W2).

With such arrangement, the magnetic field on the gap G side may be intensive enough to retain the magnetic fluid (the inner ring magnetic fluid 15b) stably. The portion of the inner ring 3 facing the gap G where the magnetic fluid is retained may be chamfered into a chamfered (tapered) surface 3f instead of being formed into a step as in the above embodiments. With such a chamfered surface, the magnetic fluid may also be retained stably in the gap G.

With such a bearing, there is no need of working a member, for example, bending the polar plate. Tabular members can be simply punched. This may facilitate the fabrication and downsize the bearing. In the embodiment, the outer ring magnetic fluid 15a may be retained on the outer ring side where the polar plate may be press-fitted and fixed. However, it may also be possible that the outer ring magnetic fluid 15a is not retained. The polar plate 14 may be provided with marking or unevenness for adhering the magnet 12 in position.

Figure 8:
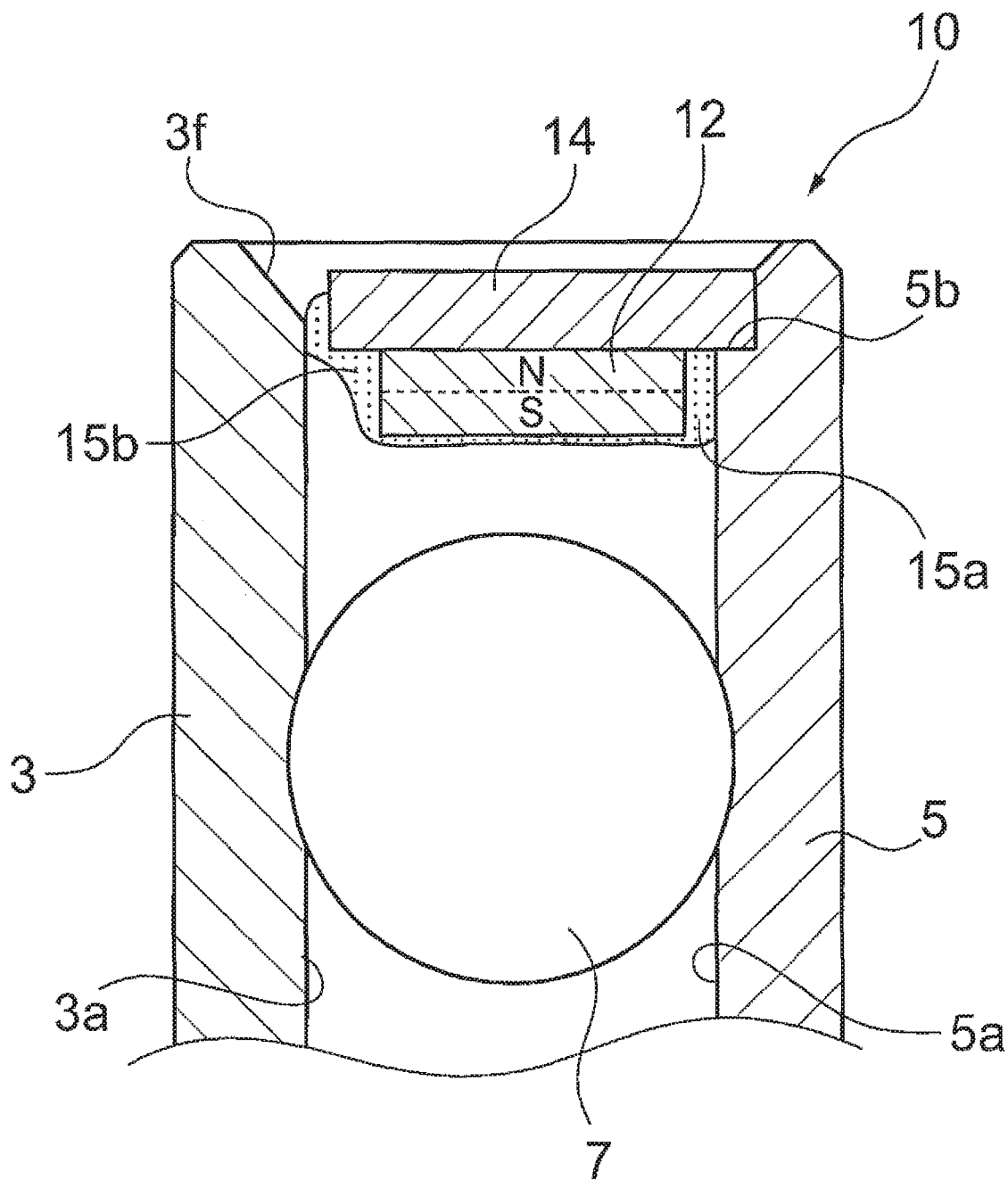
FIG. 8 is an enlarged view of a main part of a seventh embodiment of the present invention.

FIG. 8 shows the seventh embodiment of the present invention. In the embodiment as shown in FIG. 7, a step 5b may be formed in the inner circumferential surface of the outer ring 5 on the rolling member side. The step 5b may be abutted by the outer circumferential end edge of the polar plate 14 to position and fix the polar plate 14 with respect to the outer ring.

With such arrangement, the unit (12, 14) can be mounted on the inner circumferential surface of the outer ring 5 with better build-in work efficiency, as with the arrangements shown in FIGS. 2 and 4.

Figure 9:
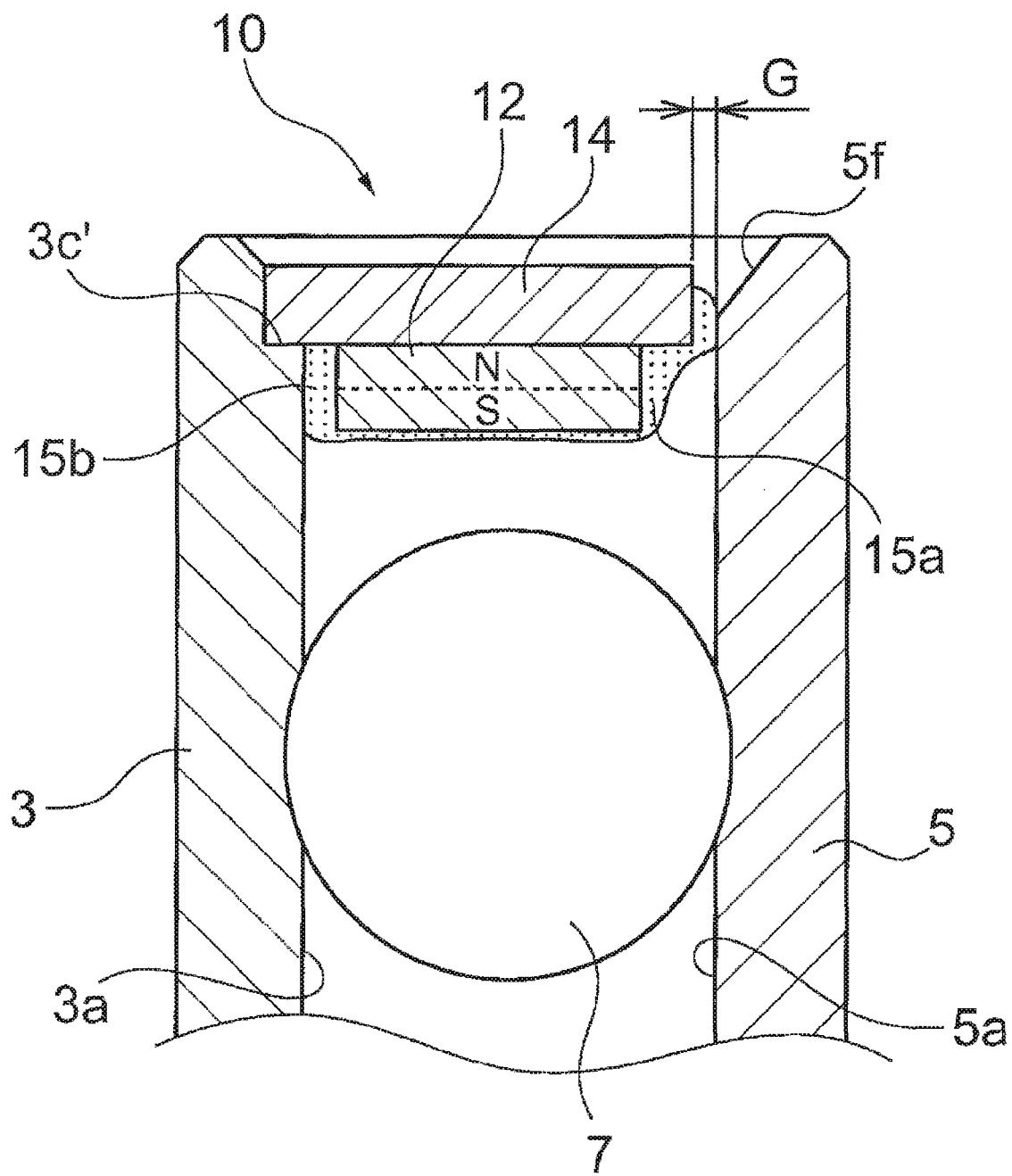
FIG. 9 is an enlarged view of a main part of an eighth embodiment of the present invention.

FIG. 9 shows the eighth embodiment of the present invention. In the embodiment shown in FIG. 8, the polar plate 14 may be mounted on the outer ring side. However, it may also be possible that the polar plate 14 be mounted on the outer circumferential surface 3a of the inner ring 3, as shown in FIG. 9.

That is, the ring-shaped polar plate 14 may be mounted on the outer circumferential surface 3a of the inner ring 3 so as to produce the gap G between the polar plate 14 and the inner circumferential surface 5a of the outer ring 5, and the outer ring magnetic fluid 15a may be retained in the gap G.

In fixing the polar plate 14 on the inner ring 3, a step 3c' may be formed in the outer circumferential surface of the inner ring on the rolling member side, as is the step in the outer ring shown in FIG. 8, and the step 3c' may be abutted by the inner circumferential end edge of the polar plate 14 for positioning. Further, a chamfered (tapered) surface 5f may be formed in the portion of the outer ring 5 facing the gap G to retain the outer ring magnetic fluid 15a stably.

Thus, when the polar plate 14 is mounted on the inner ring side, the same advantages as in the seventh embodiment can be produced.

Additionally, the embodiment having the polar plate 14 mounted on the inner ring side may also be configured as in the embodiments shown in FIG. 7. For example, the polar plate 14 may be press-fitted and fixed without forming the step 3c' in the inner ring. Further, as shown, the inner ring magnetic fluid 15b may be retained on the inner ring side, or may not be retained. In such arrangement, the same advantages as in the above embodiments can be produced.

Embodiments of the present invention are not limited to the above descriptions and are susceptible to various modifications. For example, in the above embodiment, the surfaces of the inner ring 3 and the outer ring 5 should preferably be subjected to electrolytic chromate treatment. The electrolytic chromate treatment may prevent cracking in the surface caused by rust or corrosion and thus securely prevent dust and foreign substances from entering inside.

In the above embodiments, a ring-shaped shield (sealing cover) may be press-fitted and fixed from axially outer direction onto the axially outer surface of the polar plate 14 disposed on the opening side. Such a shield can be formed of a corrosion-resistant and heat-resistant material such as stainless steel (SUS304) or a resin and may effectively prevent penetration of foreign substances and adhesion of magnetic matters (foreign substances) such as iron sand onto the magnet 12.

What is claimed is:
1. A magnetic fluid sealed bearing, comprising:
an inner ring and an outer ring formed of a magnetic material;
a plurality of rolling members disposed between the inner ring and the outer ring;
a ring-shaped polar plate formed of a magnetic material, the ring-shaped polar plate being mounted on an inner circumferential surface of the outer ring such that a gap is produced between the ring-shaped polar plate and an outer circumferential surface of the inner ring;
a ring-shaped magnet attached to an axially inner side surface of the ring-shaped polar plate, the ring-shaped magnet being magnetized such that magnetic poles thereof point to axial directions so as to form magnetic circuits on both the outer ring side and the inner ring side, the ring-shaped magnet having a smaller radial length than the ring-shaped polar plate; and
an inner ring magnetic fluid for sealing the gap, the inner ring magnetic fluid being retained in the magnetic circuit formed on the inner ring side,
wherein the ring-shaped polar plate includes a constraining portion for positioning and fixing the ring-shaped magnet, the constraining portion being configured to constrain the ring-shaped magnet from moving in an axial direction and a radial direction.

2. The magnetic fluid sealed bearing of claim 1, wherein
the constraining portion includes an outer ring-side wall formed by bending a radial end portion of the ring-shaped polar plate on the outer ring side, and
an outer circumferential surface of the ring-shaped magnet abuts the outer ring-side wall for positioning the ring-shaped magnet.

3. The magnetic fluid sealed bearing of claim 1, wherein
the constraining portion includes an inner ring-side wall formed by bending a radial end portion of the ring-shaped polar plate on the inner ring side, and
an inner circumferential surface of the ring-shaped magnet abuts the inner ring-side wall for positioning the ring-shaped magnet.

4. The magnetic fluid sealed bearing of claim 2, wherein
a step is formed in the inner circumferential surface of the outer ring on the rolling member side, and
an end surface of the outer ring-side wall abuts the step for positioning and fixing the ring-shaped polar plate on the outer ring.

5. The magnetic fluid sealed bearing of claim 1, wherein an outer ring magnetic fluid is retained in the magnetic circuit formed on the outer ring side.

6. A magnetic fluid sealed bearing, comprising:
an inner ring and an outer ring formed of a magnetic material;
a plurality of rolling members disposed between the inner ring and the outer ring;
a ring-shaped polar plate formed of a magnetic material, the ring-shaped polar plate being mounted on an outer circumferential surface of the inner ring such that a gap is produced between the ring-shaped polar plate and an inner circumferential surface of the outer ring;
a ring-shaped magnet attached to an axially inner side surface of the ring-shaped polar plate, the ring-shaped magnet being magnetized such that magnetic poles thereof point to axial directions so as to form magnetic circuits on both the outer ring side and the inner ring side, the ring-shaped magnet having a smaller radial length than the ring-shaped polar plate; and
an outer ring magnetic fluid for sealing the gap, the outer ring magnetic fluid being retained in the magnetic circuit on the outer ring side,
wherein the ring-shaped polar plate includes a constraining portion for positioning and fixing the ring-shaped magnet, the constraining portion being configured to constrain the ring-shaped magnet from moving in an axial direction and a radial direction.

7. The magnetic fluid sealed bearing of claim 6, wherein
the constraining portion includes an inner ring-side wall formed by bending a radial end portion of the ring-shaped polar plate on the inner ring side, and
an inner circumferential surface of the ring-shaped magnet abuts the inner ring-side wall for positioning the ring-shaped magnet.

8. The magnetic fluid sealed bearing of claim 6, wherein
the constraining portion includes an outer ring-side wall formed by bending a radial end portion of the ring-shaped polar plate on the outer ring side, and
an outer circumferential surface of the ring-shaped magnet abuts the outer ring-side wall for positioning the ring-shaped magnet.

9. The magnetic fluid sealed bearing of claim 7, wherein
a step is formed in the outer circumferential surface of the inner ring on the rolling member side, and
an end surface of the inner ring-side wall abuts the step for positioning and fixing the ring-shaped polar plate on the inner ring.

10. The magnetic fluid sealed bearing of claim 6, wherein an inner ring magnetic fluid is retained in the magnetic circuit formed on the inner ring side.

11. A magnetic fluid sealed bearing, comprising:
an inner ring and an outer ring formed of a magnetic material;
a plurality of rolling members disposed between the inner ring and the outer ring;
a ring-shaped polar plate formed of a magnetic material, the ring-shaped polar plate being mounted on an inner circumferential surface of the outer ring such that a gap is produced between the ring-shaped polar plate and an outer circumferential surface of the inner ring;
a ring-shaped magnet attached to an axially inner side surface of the ring-shaped polar plate, the ring-shaped magnet being magnetized such that magnetic poles thereof point to axial directions so as to form magnetic circuits on both the outer ring side and the inner ring side, the ring-shaped magnet having a smaller radial length than the ring-shaped polar plate; and
an inner ring magnetic fluid for sealing the gap, the inner ring magnetic fluid being retained in the magnetic circuit on the inner ring side,
wherein the ring-shaped magnet is adhered to the ring-shaped polar plate so as to produce an inner ring gap and an outer ring gap, the inner ring gap being produced between the ring-shaped magnet and the inner ring, and the outer ring gap being produced between the ring-shaped magnet and the outer ring, and
wherein a step is formed in the inner circumferential surface of the outer ring on the rolling member side, and
an outer circumferential end edge of the ring-shaped polar plate abuts the step for positioning and fixing the ring-shaped polar plate on the outer ring.

12. The magnetic fluid sealed bearing of claim 11, wherein an outer ring magnetic fluid is retained in the magnetic circuit formed on the outer ring side.

13. A magnetic fluid sealed bearing, comprising:
an inner ring and an outer ring formed of a magnetic material;
a plurality of rolling members disposed between the inner ring and the outer ring;
a ring-shaped polar plate formed of a magnetic material, the ring-shaped polar plate being mounted on an outer circumferential surface of the inner ring such that a gap is produced between the ring-shaped polar plate and an inner circumferential surface of the outer ring;
a ring-shaped magnet attached to an axially inner side surface of the ring-shaped polar plate, the ring-shaped magnet being magnetized such that magnetic poles thereof point to axial directions so as to form magnetic circuits on both the outer ring side and the inner ring side, the ring-shaped magnet having a smaller radial length than the ring-shaped polar plate; and
an outer ring magnetic fluid for sealing the gap, the outer ring magnetic fluid being retained in the magnetic circuit on the outer ring side,
wherein the ring-shaped magnet is adhered to the ring-shaped polar plate so as to produce an inner ring gap and an outer ring gap, the inner ring gap being produced between the ring-shaped magnet and the inner ring, and the outer ring gap being produced between the ring-shaped magnet and the outer ring, and wherein a step is formed in the outer circumferential surface of the inner ring on the rolling member side, and an inner circumferential end edge of the ring-shaped polar plate abuts the step for positioning and fixing the ring-shaped polar plate on the inner ring.

14. The magnetic fluid sealed bearing of claim 13, wherein an inner ring magnetic fluid is retained in the magnetic circuit formed on the inner ring side.

* * * * *